United States Patent [19]

Morimoto et al.

[11] 4,107,663

[45] Aug. 15, 1978

[54] OPERATION STATE DISPLAY APPARATUS

[75] Inventors: Katsuhide Morimoto; Masaji Matsumura; Nobuharu Yamauchi, all of Amagasaki; Haruo Koyanagi, Musashi-Murayami; Iwao Sato, Komae; Buhei Yasuhara; Jiro Sakai, both of Tokyo, all of Japan

[73] Assignees: Mitsubishi Denki Kabushiki Kaisha, Tokyo; Nissan Motor Company, Limited, both of Japan

[21] Appl. No.: 555,597

[22] Filed: Mar. 5, 1975

[30] Foreign Application Priority Data

Mar. 26, 1974 [JP] Japan .................................. 49-34096
Mar. 26, 1974 [JP] Japan .................................. 49-24097

[51] Int. Cl.[2] ............................................... G06F 3/14
[52] U.S. Cl. .............................. 340/324 AD; 364/855
[58] Field of Search ................... 340/324 A, 324 AD; 235/198

[56] References Cited

U.S. PATENT DOCUMENTS 3,474,438 10/1969 Lauher ............................ 340/324 A
3,522,597 8/1970 Murphy .......................... 340/324 A

*Primary Examiner*—Marshall M. Curtis
*Attorney, Agent, or Firm*—Oblon, Fisher, Spivak, McClelland & Maier

[57] ABSTRACT

An operation state display apparatus includes a counter for receiving input signals which respectively represent the individual operation states of a controlled object and for counting the duration time of at least one of the ON and OFF state of the input signal. A memory device is provided for memorizing the period of time lapse from an operation initiation reference time when the input signal goes from the OFF state to the ON state or vice versa. A display device is provided for displaying in the form of a time chart the operation state of the controlled object according to the data of the counter and of the memory device. The reference operation state of the controlled object can also be displayed on the display device.

4 Claims, 8 Drawing Figures

OPERATION STATE DISPLAY APPARATUS

BACKGROUND OF THE INVENTION

1. Field of the Invention

The present invention relates to an operation state display apparatus for displaying the operation state of a controlled object.

2. Description of the Prior Art

In a sequence control system which performs a given control operation repeatedly on a regular cycle and in a predetermined order, it has heretofore been extremely difficult to ascertain the position of the machine under control and when and how long and in what order the control elements such as limit switches and solenoid valves have been activated and deactivated. This has made it difficult to service a control system when the controlled object operates abnormally or fails to operate. One approach to this problem is the provision of information on the reference operation and on the operation of the controlled object over a period from the start of one work step, the two informations being available concurrently in a readily visual form. Thus, by comparing these informations with each other, it is possible to expedite the detection of any abnormal machine operation even at such an early stage that the machine appears to be operating normally. Hence, the machine can be stopped before the controlled object is seriously damaged, the cause of abnormality can be easily located, and the machine can be quickly serviced for return to the control line with the result that the machine can be operated with a greater availability and efficiency.

SUMMARY OF THE INVENTION

With the aim to overcome the prior art difficulties, the invention has for an object the provision of a display apparatus capable of automatically monitoring the operation state of a controlled object such as, for example, the ON or OFF state, or the duration of the ON or OFF state of a control element such as a limit switch or a solenoid valve, and capable of displaying in the form of a time chart the operation state on a cathode-ray display device or other suitable display device. Thus, according to the invention, each operation state of the controlled object is automatically detected and displayed on a display device to enable the operator to know the position of the machine under control in each work step and how long each operation has run since the beginning of each work step. Therefore, in the event of abnormal machine operation, it is possible to quickly locate the cause of the abnormality according to the information of the operation states displayed in the form of a time chart.

It is another object of the invention to provide an operation state display apparatus capable of displaying a reference operation state of a controlled object, as well as an actual operation state. Thus, each operation state of the controlled object, and also the reference operation state, are automatically detected and displayed in the form of a time chart on a display device to enable the operator to know the position of the machine under control in a work step and how long each operation has run since the beginning of work. In the event of abnormal machine operation, it is possible to detect at an early stage the cause of abnormality according to the information on the actual operation state and the reference operation state which are displayed on a display device.

The foregoing and other objects are attained in accordance with one aspect of the present invention through the provision of an operation state display apparatus comprising: a counter for receiving input signals which respectively represent the individual operation states of a controlled object and for counting the duration time of at least one of the ON and OFF states of the input signal; a memory device for memorizing the period of time lapse from an operation initiation reference time when the input signal changes to the OFF state from the ON state or vice versa; and a display device for displaying in the form of a time chart the operation state of the controlled object according to the data of the counter and the memory device.

BRIEF DESCRIPTION OF THE DRAWINGS

Various objects, features and attendants advantages of the present invention will be more fully appreciated as the same becomes better understood from the following detailed description of the present invention when considered in connection with the accompanying drawings in which.

DETAILED DESCRIPTION OF THE PREFERRED EMBODIMENTS

Figure 1:
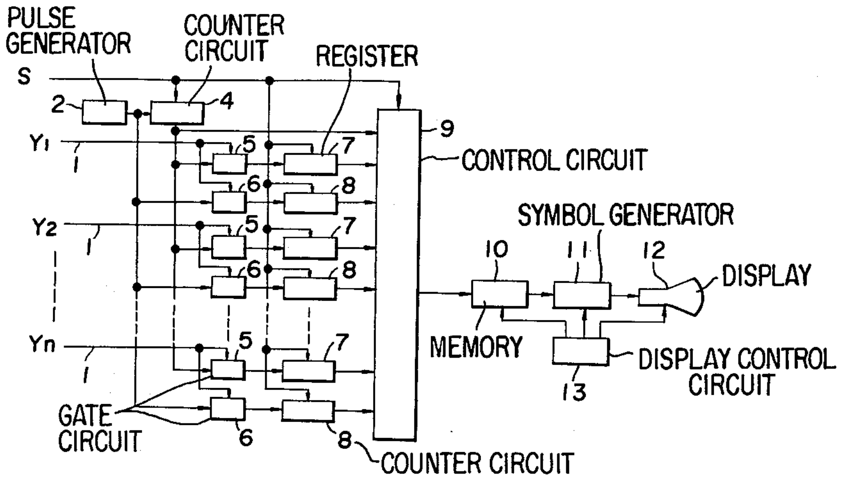
FIG. 1 is a block diagram showing a first embodiment of the invention.

Referring now to the drawings, wherein like reference numerals designate identical or corresponding parts throughout the several views, and more particularly to FIG. 1 thereof, a first embodiment of the invention is shown in block form wherein the numeral 1 denotes an input signal representing the operation state of a controlled object such as a limit switch or a solenoid valve. In this embodiment, the number of input signals is $n$ ($n$: a positive integer), which are designated as $Y_1, Y_2, \ldots, Y_n$. The numeral 2 denotes a pulse generator capable of generating pulse trains at a given cycle, S a start signal supplied as the beginning of one work step for a controlled object, 4 and 8 counter circuits, 5 and 6 gate circuits, 7 a register, 9 a control circuit, 10 a memory, 11 a symbol generator, 12 a display, and 13 a display control circuit. For explanatory simplicity, it is assumed that the ON state of each input signal occurs once for the period of one work step of a controlled object, and the ON state of the input signal is monitored as the operation state thereof.

When the start signal S arrives from a controlled object, the counter circuits 4 and 8 and register 7 are reset, and the memory 10 is cleared. The counter circuit 4 sequentially counts pulse trains supplied from the pulse generator 2. Then, when the input signal $Y_1$ changes to the ON state from the OFF state, the gate circuit 5 corresponding to $Y_2$ turns off and the existing data in the counter circuit 4 is stored in the register 7. The gate circuit 5 opens its gate only when the input signal $Y_1$ changes to the ON state from the OFF state, and, as a result, the data in the counter circuit 4 is stored in the register 7. The process of storing data in the register 7 from the counter circuit 4 is not performed for the period when the input signal $Y_1$ remains in the ON or OFF state, or when $Y_1$ changes to the OFF state from the ON state.

The gate circuit 6 opens its gate for the period the input signal $Y_1$ is in the ON state, and the counter circuit 8 counts pulse trains from the pulse generator 2. In the same way, the gate circuits 5 and 6, register 7 and counter circuit 8 which correspond to the individual input signals $Y_2, \ldots, Y_n$ are operated.

After these operations, the register 7 processes data representing the time at which the corresponding input signal 1 turned on after the arrival of start signal S, and the counter circuit 8 has data representing the duration of time for which the input signal 1 remains on.

The control circuit 9 supplies the memory 10 with the data of the register 7 and of the counter circuit 8 with respect to each input signal, either at a regular cycle or at random. Thus, an adequate display symbol code is written in the memory 10 at an address corresponding to each input signal. This memory 10 has a capacity substantially equal to the number of symbols displayable on the display 12, and permits the writing and the reading of data when desired. Data written in an address is kept stored until more data is written in the same address or the existing data is cleared by a reset signal. The symbol code written in the memory is read at a given cycle and sent to the symbol generator 11. This symbol generator is a read-only-memory capable of converting the symbol codes into a dot matrix such as a 5×7 dot matrix. Data reading from the dot matrix is done synchronously with the raster scan. Thus, the data are read 5 dots each from the top to the bottom by the raster scan and displayed on the display 12 such as a cathode-ray tube. The following methods may be used to designate the memory address of the memory 10 where the time chart data supplied from the control circuit 9 is written:

- the method in which the display screen is divided into sections in a matrix form, and the memory address where the code to be displayed is located is designated by the line position (in the direction of the Y-axis) and the column position (in the direction of the X-axis); and
- the method in which a series of memory addresses are assigned to the entire memory, and a desired one of these absolute addresses is designated.

In this embodiment, a method based on the latter will be described for the sake of illustration. According to this method, display symbol codes are written into the memory from an address substantially dependent on the address of a given input signal and on the data stored in the register 7 corresponding to the given input signal to an address substantially dependent on the data of the counter circuit 8.

More specifically, for example, assume that addresses 100 to 199 are allotted to the input signal $Y_1$; addresses 200 to 299 to the signal $Y_2$; . . . and addresses **100*xn* to 100*xn* + 99 to the signal $Y_n$, that the data of the register 7 is 3 and the data of the counter circuit 8 is 4 for the input signal $Y_1$, and that the data of the register 7 is 7 and the data of the counter circuit 8 is 5 for the input signal $Y_2$. For the input signal $Y_1$, display symbol codes are written to four numbers from the addresses 103 to 106. For input signal $Y_2$, display symbol codes are written to five numbers from the address 207(200 + 7)** to the *a* address 211 because the addresses 200 to 299 are allotted to the signal $Y_2$. In this manner, display symbol codes are written into the memory for the individual input signals up to $Y_n$ according to the data of the register 7 and the counter circuit 8 corresponding to the individual input signals. In this embodiment, the oscillation frequency of the pulse generator 2 is determined to be a value substantially dependent on the maximum number of symbols displayable on the display in the lateral direction, as well as on the maximum period of time required to complete one work step for a controlled object and on the duration of the ON period for an input signal. By this consideration, a time chart for a certain input signal will not overflow the display screen edges and will not interfere with the time chart for another input signal.

Figure 2:
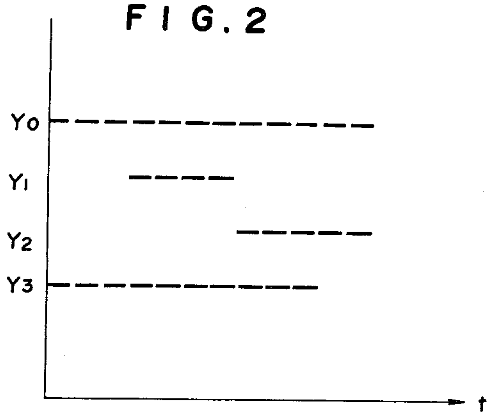
FIG. 2 is a time chart useful for illustrating one example of the operation state of a controlled object displayed on the display device shown in FIG. 1.

One example of this time chart is shown in FIG. 2. Assume that the oscillation frequency of the pulse generator 2 is determined so that one display line has 100 addresses on the display. The time lapse from the beginning of work to the present is found from the data of the counter circuit 4. Hence, when the memory addresses 0 to 99 are assigned to the addresses for the chart showing the operation history from the beginning of work, the display symbol codes are written therein from the address 0 to the number dependent on the data of the counter circuit 4 and displayed as one indicated by $Y_0$.

The input signals $Y_1$, $Y_2$ and $Y_3$ to which the addresses 100 to 199, 200 to 299, and 300 to 399 are allotted, respectively, are displayed as indicated by $Y_1$, $Y_2$ and $Y_3$ respectively in FIG. 2. As shown, the signal $Y_1$ turns on 3 seconds after the start signal S and lasts for 4 seconds; the signal $Y_2$ turns on 7 seconds after the start signal S and lasts for 5 seconds; and the signal $Y_3$ is in its ON state from the beginning and lasts for 10 seconds thereafter.

As described, the counter circuits 4 and 8, register 7 and memory 10 are reset by the start signal S. However, these circuits may be reset by a work step end signal or the like instead of the start signal S. Also, as described, the input signal turns on only once during one work step. Instead of this operation, the input signal may assume the ON or OFF state more than once. For example, the data of register 7 and counter circuit 8 are written in the memory 10 through the control circuit 9 while the input signal is in the OFF state and then the corresponding register 7 and counter circuit 8 are reset. Alternatively, the counter circuit 8 may be reset also when the input signal changes to the ON state from the OFF state. If this arrangement is made, the data of the counter circuit 4 at the time when the input signal turns on again is stored in the register 7 and the period for which the input signal 1 has been in the ON state is counted by the counter circuit 8. In this case, the data stored in the register 7 usually differs before and after the input signal turns into the ON state. Since the addresses in the memory 10 where these data are stored depend on the data of the register 7 and counter circuit 8, the operation state of an input signal which repeats its ON and OFF states more than once for the period of one work step can be properly displayed in the form of a chart without affecting the data previously written in the memory or the data written therein for another input signal system.

Figure 3:
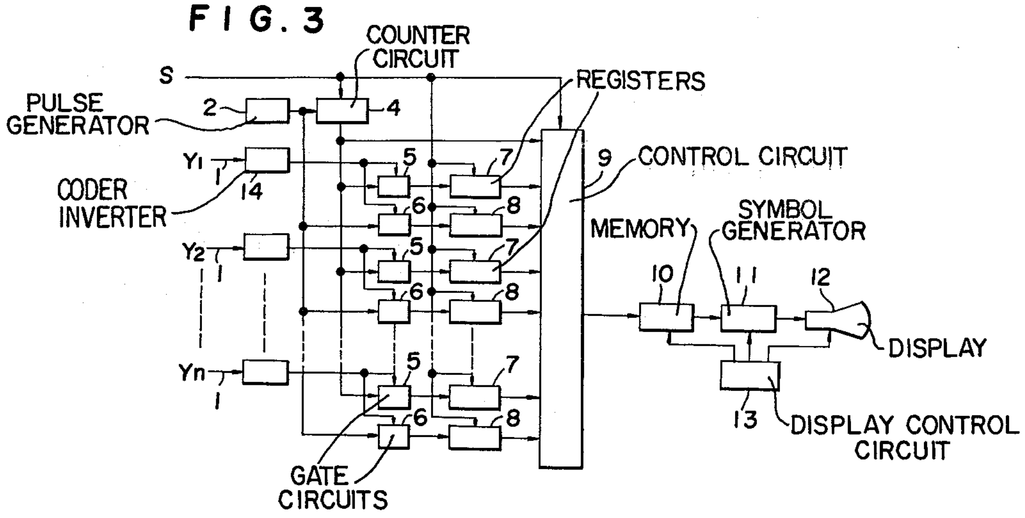
FIG. 3 is a block diagram showing a second embodiment of the invention.

FIG. 3 shows in block form a second embodiment of the invention wherein a coder inverter 14 is inserted in the path of the input signal 1 of FIG. 1, and thus an OFF state is monitored and displayed as the operation state of a controlled object. This inverter 14 generates a signal of an OFF state when the input signal 1 is in the ON state, and a signal of an ON state when the input signal 1 is in the OFF state.

The third embodiment of the invention will be described by referring to FIG. 4 wherein the numeral 1 denotes an input signal representing the operation state of a controlled object such as a limit switch or a solenoid valve. In this embodiment, the number of dots of the input signals is *n* (*n:* a positive integer), which are designated as $Y_1$, $Y_2$, . . . $Y_n$. The numeral 2 denotes a pulse generator capable of generating pulse trains at a regular cycle, S a start signal generated at the beginning of one work step of a controlled object, 4 and 8 counter circuits, 5 and 6 gate circuits, 7 a register, 9 a control circuit, 10 a memory, 11 a symbol generator, 12 a display device, 13 a display control circuit, and 15 a reference operation set circuit comprising a reference operation initiation set circuit 16 and a reference operation time-width set circuit 17. For the sake of explanatory simplicity, it is assumed that each input signal turns on once during one work step of a controlled object, and the ON state of the input signal is monitored as the operation state thereof.

Figure 5:
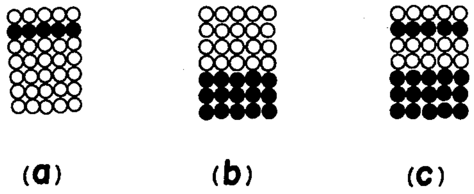
FIG. 5 is a diagram of dot matrices read out from the symbol generator shown in FIG. 4.

When the start signal S is supplied from a controlled object, the counter circuits 4 and 8 and the register 7 are reset. At the same time, the memory 10 is cleared through the control circuit 10. Then the reference operation display data corresponding to each input signal, which display data is previously set in the reference operation set circuit 15, is written in terms of a reference operation display symbol code such as code "1" in the memory address in memory 10, which memory address corresponds to the number of each input signal. The memory 10 has a capacity substantially equal to the number of symbols displayable on the display 12 and permits data to be written or read when desired. The data, once stored in an address, remains until other data is written in the same address or the existing data is cleared. The symbol code written in the memory is read out at a given cycle and supplied to the symbol generator 11. This symbol generator is a read-only-memory which converts the symbol codes into a 5×7 dot matrix such as (a) in FIG. 5 when the symbol code is "1"; or a 5×7 dot matrix such as (b) when it is "2"; or a 5×7 dot matrix such as (c) when it is "3". Data on the dot matrix are read synchronously with the raster scan, by 5 dots each from top to bottom, and thus all the data are read by seven scans. The read data are displayed on a display 12 such as a cathode-ray tube. The memory address having the time chart data supplied from the control circuit 9 is designated as follows. For example, one method is such that the display screen is divided into sections in a matrix form and the position of code to be displayed, i.e., the memory address corresponding to the cross-point on the matrix where the code is located, is designated by the line position (in the direction of Y-axis) and the column position (in the direction of X-axis). Another method is such that a series of memory addresses are allotted to the entire memory and a desired one of these absolute addresses is designated. In this embodiment, a method based on the latter will be described for the sake of illustration. According to this method, reference operation display symbol codes are written in the memory to a number substantially dependent, for example, on the data stored in the reference operation time-width set circuit 17. These codes are written therein from the address substantially dependent on the number of input signal dots and on the data of the reference operat on initiation set circuit 16.

More specifically, for example, addresses 100 to 199 are allotted to the input signal $Y_1$; addresses 200 to 299 to the input signal $Y_2$; . . . addresses 100 *xn* to 100 *xn* + 99 to the input signal $Y_n$. It is assumed that the data in the reference operation initiation set circuit 16 for the input signal $Y_1$ is 0 and the data in the reference operation time-width circuit 17 for the signal $Y_1$ is 8; and the data in the reference operation initiation set circuit 16 for the signal $Y_2$ is 8 and the data in the reference operation time-width set circuit 17 for the signal $Y_2$ is 4.

Figure 6:
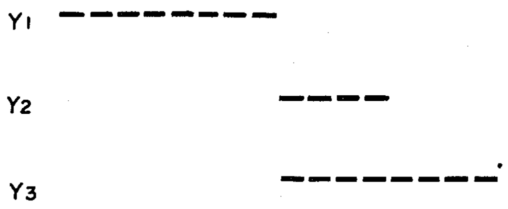
FIGS. 6-7 are time charts displayed on the display shown in FIG. 4.

For $Y_1$, reference operation display symbol codes are written to 8 numbers from the address 100 to 107. For $Y_2$, reference operation display symbol codes are written to 4 numbers from the address 208 (200 + 8) to 211 since the memory addresses allotted to the signal $Y_2$ are from 200 to 299. Similarly, reference operation display symbol codes are written in the memory 10 for the input signals up to $Y_n$ according to the data of the reference operation initiation set circuit 16 and the reference operation time-width set circuit 17. The resultant data is displayed on the display 12 in the form of a time chart as shown in FIG. 6. The actual operation state of a controlled object is displayed in the following manner. First, the counter circuits 4 and 8 are reset by the start signal S. The counter circuit 4 sequentially counts the pulse trains supplied from the pulse generator 2. When the input signal $Y_1$ changes to the ON state from the OFF state, the gate circuit 5 corresponding to the signal $Y_1$ opens its gate, and the existing data in the counter circuit 4 is stored in the register 7 which corresponds to the signal $Y_1$. This gate circuit 5 opens its gate only when the input signal $Y_1$ changes to the ON state from the OFF state and the data of the counter circuit 4 is transferred to the register 7. The transfer of data from the counter circuit 4 to the register 7 is not done when the input signal $Y_1$ is in the ON state or during its OFF state or when it changes to its OFF state from its ON state.

The gate circuit 6 opens its gate when the input signal $Y_1$ is in the ON state and the pulse trains from the pulse generator 2 are counted by the counter circuit 8. In the same manner, the gate circuits 5 and 6, the register 7 and the counter circuit 8 are operated for the input signals $Y_2$, . . . $Y_n$.

As a result of the above operations, the data in the register 7 represents the time the corresponding input signal 1 turns on after the start signal S and the data in the counter circuit 8 represents the width of on time of the input signal 1. The actual operation state data thus provided is written in the memory in the form of an actual operation display symbol code such as "2" as in the case where the reference operation data given to the reference operation set circuit 15 through the control circuit 9 is written in the memory. New data is written therein in the form, for example, of a logical OR on the actual operation display symbol code and the reference operation display symbol code without destroying the reference operation display symbol code previously written in the same memory address. Thus, according to the code data in the same memory address, there is only the reference operation in the case of code "1", only the actual operation in the case of code "2", or both the reference operation and the actual operation in the case of code "3". Therefore, when it is so arranged that the dot matrix read from the symbol generator 11 changes such as (a), (b) and (c) of FIG. 5 according to the codes "1", "2" and "3", it is possible to change the display code according to the combination of the two operation states.

As described, the period of time from the beginning of work to the present can be found from the data in the counter circuit 4. Hence, when the memory addresses 0 to 99 are allotted to the addresses for the chart showing operation history from the beginning of work, display symbol codes are written therein from address 0 to a number depending on the data of the counter circuit 4. This state is displayed as $Y_0$ in FIG. 4. Then, when the oscillation frequency of the pulse generator 2 is determined to be a value substantially dependent on the maximum number of symbols displayable in the lateral direction on the display 12, as well as on the maximum period of time required for one work step of a controlled object and on the width of the ON time for a given input signal, the time chart for an input signal cannot overflow the display screen edges or interfere with the time chart for another input signal.

Figure 7:
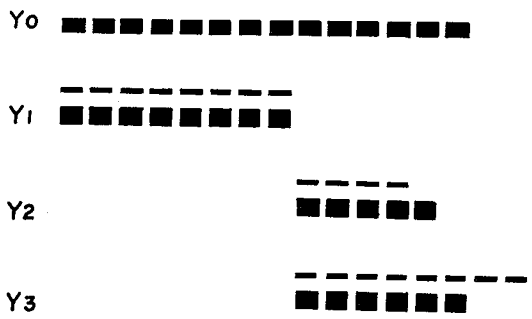

FIG. 7 shows a time chart displayed after the operation described above. In this example, the oscillation frequency of the pulse generator 2 is determined so that one display symbol letter corresponds to one second, and the display line on the display is carried over by 100 addresses. In FIG. 7, the signal $Y_1$ is in the ON state at the instant of the presence of the start signal for both the reference and actual operation states and remains in the ON state for 8 seconds. The signal $Y_2$ turns on 8 seconds after the start signal, and remains in the ON state for 4 seconds. However, according to the movement of the actual controlled object, the chart shows that the signal $Y_2$ turns on 8 seconds after the start signal, and remains in the ON state for 5 seconds.

As seen from the time chart for the signal $Y_0$ which shows the operation time lapse from the start signal to the present, the signal $Y_3$ turns on 8 seconds after the start signal with respect to the reference operation, and remains in the ON state for 8 seconds. For the actual operation, the signal $Y_3$ turns on 8 seconds after the start signal, and remains in the ON state for 6 seconds and continues in the ON state.

In this embodiment, the reference operation display data to the display 12 of the reference operation set circuit 15 is stored in the memory 10, and then the data in the memory 10 is read whereby the operation state is displayed. Alternatively, the reference operation data may be supplied directly to the symbol generator 11 or to the display 2 without the memory 10. Also, instead of clearing all the data in the memory 10 at the time the start signal S is given, only the memory region of the actual operation state data may be cleared. Alternatively, without clearing the memory 10, a code such as a space code (which is other than the ON state display symbol code) may be written in a region other than one dependent on the data in the register 7 and in the counter circuit 8 and at a number of input points, that is, the region where the input signal is in its OFF state. Also, in this embodiment, the counter circuits 4 and 8, the register 7 and the memory 10 are reset by the start signal S. Alternatively, these circuits may be reset by a suitable signal such as a one-work-step end signal. As described, the input signal can turn on only once during one work step. Alternatively, the ON and OFF states may be repeated more than once. More specifically, for the number of data set on the reference operation set circuit 15, set circuits 16 and 17 may be provided corresponding to the repetition of the ON-OFF states. When it is so arranged that the number of symbols based on the data in the register 7 and counter circuit 8 is written in the memory 10 through the control circuit 9 when the input signal is in the OFF state, and the corresponding register 7 and counter circuit 8 are reset, the data in the counter circuit 4 at the time when the input signal changes to the ON state is stored in the register 7, and the period of ON time of the input signal 1 is counted by the counter circuit at the same time. In this case, the data in the register 7 differs before and after the the input signal is turned on. As described, the memory addresses of the memory 10 in which these data are written (or stored) depend on the input signal dot numbers, the data in the register 7 corresponding to the given input and the data in the counter circuit 8. Hence, the operation state of an input signal which effects repition of the ON-OFF states more than once during one work step can also be displayed in the form of a chart without affecting the data previously written in the memory or the data in the memory for another input signal system.

Figure 4:
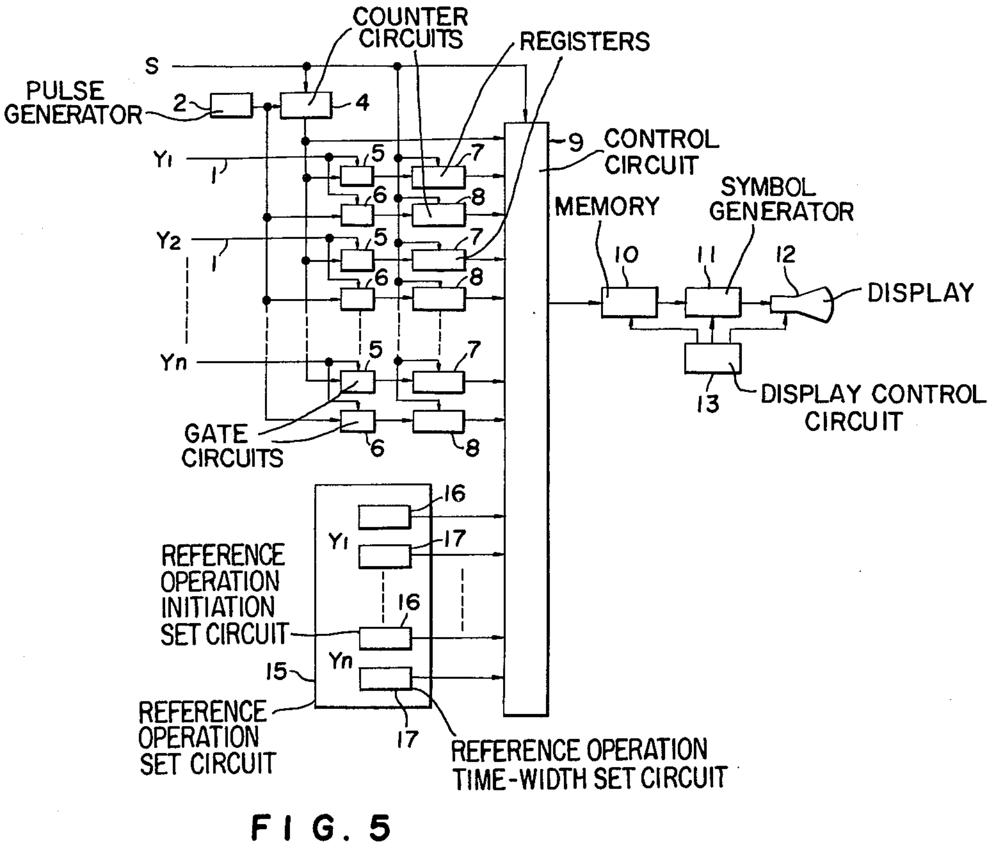
FIG. 4 is a block diagram showing a third embodiment of the invention.
Figure 8:
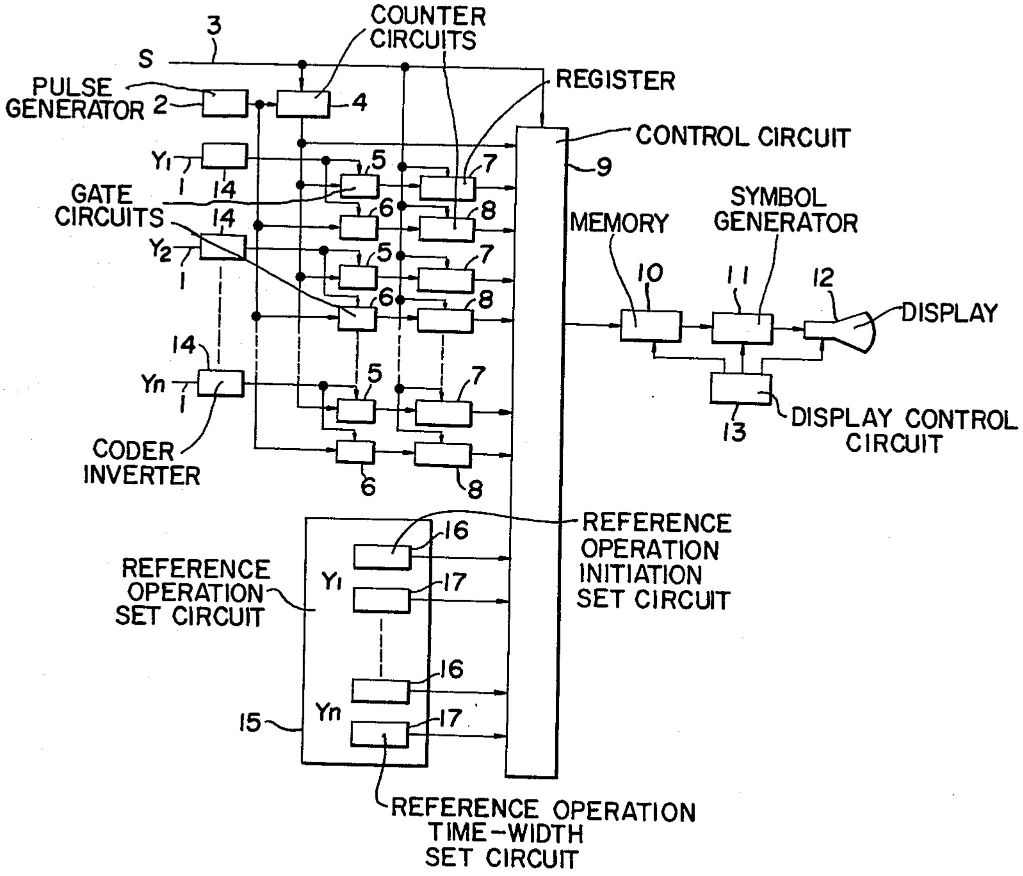
FIG. 8 is a block diagram showing a fourth embodiment of the invention.

FIG. 8 shows in block form another embodiment of the invention wherein a code inverter 14 is disposed in the path of the input signal 1 shown in FIG. 4, and the OFF state is monitored and displayed to show the operation state of a controlled object.

This code inverter 14 is a circuit capable of generating an output of an OFF state when the input signal 1 is in the ON state, or an output of the ON state when it is in the OFF state.

In the foregoing embodiments, a cathode-ray tube is used to display the operation states of a controlled object. Alternatively, instead of a cathode-ray tube, a plasma display, a lamp display, a symbol display equivalent to a digital display tube, or a printer such as a typewriter or a line printer may be used.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. An operation state display apparatus comprising:

a start input signal line for receiving a start signal, a first input signal line for receiving a first input signal having on and off states representing the operation state of a first controlled object, a second input signal line for receiving a second input signal having on and off states representing the operation state of a second controlled object, a pulse generator for generating pulse trains at a predetermined cycle, a first counter circuit, a first gate circuit which assumes its on state when the first input signal is in the on state and its off state when the first input signal is in the off state, a second gate circuit which assumes its on state when the first input signal is in the on state and its off state when the first input signal is in the off state, a third gate circuit which assumes its on state when the second input signal is in the on state and its off state when the second input signal is in the off state, a fourth gate circuit which assumes its on state when the second input signal is in the on state and its off state when the second input signal is in the off state,
a first register,
a second register,
a second counter circuit,
a third counter circuit,
a control circuit means,
a memory for storing signals representative of the period of time lapse from an operation initiation reference time when the first or second input signal changes from its off state to its on state or from its on state to its off state,
a symbol generator,
a display control circuit means,
a display for displaying in the form of a time chart the operation state of the first and the second controlled objects,
means connecting the start input signal line to a second input of the first counter circuit, to a second input of the first register, to a second input of the second counter circuit, to a second input of the second register, to a second input of the third counter circuit and to a first input of the control circuit,
means connecting the output of the pulse generator to a first input of the first counter circuit, to a first input of the second gate circuit and to a first input of the fourth gate circuit,
means connecting the output of the first counter circuit to a second input of the control circuit, to a first input of the first gate circuit and to a first input of the third gate circuit,
means connecting the first input signal line to a second input of the first gate circuit and to a second input of the second gate circuit,
means connecting the second input signal line to a second input of the third gate circuit and to a second input of the fourth gate circuit,
means connecting the output of the first gate circuit to a first input of the first register,
means connecting the output of the second gate circuit to a first input of the second counter circuit,
means connecting the output of the third gate circuit to a first input of the second register,
means connecting the output of the fourth gate circuit to a first input of the third counter circuit,
means connecting the output of the first register to a third input of the control circuit,
means connecting the output of the second counter circuit to a fourth input of the control circuit,
means connecting the output of the second register to a fifth input of the control circuit,
means connecting the output of the third counter circuit to a sixth input of the control circuit,
means connecting the output of the control circuit to a first input of the memory,
means connecting the output of the memory to a first input of the symbol generator,
means connecting the output of the symbol generator to a first input of the display,
means connecting a first output of the display control circuit to a second input of the memory,
means connecting a second output of the display control circuit to a second input of the symbol generator,
means connecting a third output of the display control circuit to a second input of the display,
said control circuit means functioning to supply the memory with the data contained in the first and second registers and the second and third counters at addresses in the memory corresponding to either the first input signal or the second input signal,
said display control circuit means functioning to cause the memory to deliver periodically data contained therein to the symbol generator, to cause the symbol generator to generate periodically symbols representative of the data supplied thereto by the memory and to cause the display to display the symbols supplied thereto on a continuous basis by the symbol generator to form a time chart showing the operation state of the first and the second controlled objects.

2. An operation state display apparatus in accordance with claim 1 further comprising:
a first coder inverter,
a second coder inverter,
means connecting the first coder inverter between the first input signal line and the second input of the first gate circuit and the second input of the second gate circuit, and
means connecting the second coder inverter between the second input signal line and the second input of the third gate circuit and the second input of the fourth gate circuit.

3. An operation state display apparatus in accordance with claim 1 further comprising:
a reference operation set circuit which has set therein reference operations of the first and the second controlled objects comprising:
a first reference operation initiation set circuit,
a first reference operation time-width set circuit,
a second reference operation initiation set circuit,
a second reference operation time-width set circuit,
means connecting the output of the first reference operation initiation set circuit to a seventh input of the control circuit,
means connecting the output of the first reference operation time-width set circuit to an eighth input of the control circuit,
means connecting the output of the second reference operation initiation set circuit to a ninth input of the control circuit, and
means connecting the output of the second reference operation time-width set circuit to a tenth input of the control circuit.

4. An operation state display apparatus in accordance with claim 2 further comprising:
a reference operation set circuit which has set therein reference operations of the first and the second controlled objects comprising:
a first reference operation initiation set circuit,
a first reference operation time-width set circuit,
a second reference operation initiation set circuit,
a second reference operation time-width set circuit,
means connecting the output of the first reference operation initiation set circuit to a seventh input of the control circuit,
means connecting the output of the first reference operation time-width set circuit to an eighth input of the control circuit,
means connecting the output of the second reference operation initiation set circuit to a ninth input of the control circuit, and
means connecting the output of the second reference operation time-width set circuit to a tenth input of the control circuit.

* * * * *